(12) United States Patent
Fournand et al.

(10) Patent No.: US 10,436,949 B2
(45) Date of Patent: Oct. 8, 2019

(54) OPTICAL LENS COATED WITH A PATTERNED REMOVABLE FILM AND METHOD FOR EDGING SUCH A LENS

(71) Applicant: Essilor International, Charenton le Pont (FR)

(72) Inventors: Gerald Fournand, Dallas, TX (US); Zeming Gou, Pearisburg, VA (US); Pascale Lacan, Charenton le Pont (FR); Dominique Conte, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 182 days.

(21) Appl. No.: 15/311,225

(22) PCT Filed: May 20, 2014

(86) PCT No.: PCT/IB2014/001290
§ 371 (c)(1),
(2) Date: Nov. 15, 2016

(87) PCT Pub. No.: WO2015/177586
PCT Pub. Date: Nov. 26, 2015

(65) Prior Publication Data
US 2017/0097446 A1   Apr. 6, 2017

(51) Int. Cl.
*B24B 9/14*   (2006.01)
*G02B 1/14*   (2015.01)
(Continued)

(52) U.S. Cl.
CPC .................. *G02B 1/14* (2015.01); *B24B 9/14* (2013.01); *B29D 11/00942* (2013.01);
(Continued)

(58) Field of Classification Search
CPC ...... B24B 9/14; B24B 13/005; B24B 13/0055
(Continued)

(56) References Cited

U.S. PATENT DOCUMENTS 2,752,738 A * 7/1956 Seifert .................... B24B 13/01
15/230.18
5,662,758 A   9/1997 Hamilton et al.
(Continued)

FOREIGN PATENT DOCUMENTS

FR   2 860 303 A1   4/2005

OTHER PUBLICATIONS

European Office Action dated Mar. 23, 2018 in European Patent Application No. 14755413.3, 6 pages.
(Continued)

*Primary Examiner* — Robert A Rose
(74) *Attorney, Agent, or Firm* — Oblon, McClelland, Maier & Neustadt, L.L.P.

(57) ABSTRACT

An optical lens includes: (i) a temporary coating for protection against degradation at least partially covering a surface of the lens, the temporary protective coating including an outermost layer mechanically degradable through friction and/or contact, and (ii) a removable film having a first side and a second side, which adheres to the outermost layer of the temporary protective coating through its first side, the first side of the removable film including at least one surface portion, which, when applied to the outermost layer of the temporary protective coating, includes at least one adherent zone and at least one non-adherent zone distributed across the surface portion.

21 Claims, 1 Drawing Sheet

(51) Int. Cl.
*B29D 11/00* (2006.01)
*G02B 1/18* (2015.01)
*B32B 37/12* (2006.01)
*G02C 7/02* (2006.01)

(52) U.S. Cl.
CPC ............ *B32B 37/1292* (2013.01); *G02B 1/18* (2015.01); *G02C 7/02* (2013.01); *B32B 2323/04* (2013.01); *B32B 2551/00* (2013.01); *G02C 2202/16* (2013.01)

(58) Field of Classification Search
USPC .................... 451/384, 390, 43, 42, 460, 921
See application file for complete search history.

(56) References Cited

U.S. PATENT DOCUMENTS

| | | |
|---|---|---|
| 5,965,235 A | 10/1999 | McGuire et al. |
| 6,858,285 B1 | 2/2005 | Hamilton et al. |
| 2005/0112314 A1 | 5/2005 | Hamilton et al. |
| 2008/0117382 A1 | 5/2008 | Lacan et al. |

OTHER PUBLICATIONS

International Search Report dated Jan. 22, 2015 in PCT/IB2014/001290 filed May 20, 2014.

\* cited by examiner

OPTICAL LENS COATED WITH A PATTERNED REMOVABLE FILM AND METHOD FOR EDGING SUCH A LENS

BACKGROUND OF THE INVENTION

1. Field of the Invention

The invention relates to an optical lens and an edging process thereof, more particularly an ophthalmic lens, having a surface comprising a temporary protective coating mechanically degradable through friction and/or contact, being in turn coated with a removable film for protecting it from such a degradation, which after removal leaves the temporary protective coating in a state allowing for satisfactory edging of the optical lens.

The invention is more particularly directed to optical articles comprising an anti-fouling topcoat such as a hydrophobic and/or oleophobic surface coating.

2. Description of Related Art

An optical lens, more particularly an ophthalmic lens, results from a sequence of molding and/or surfacing/smoothing steps determining the geometry of both convex and concave optical surfaces of the lens, followed by appropriate surface treatments.

The last finishing step of an ophthalmic lens is the edging operation consisting in machining out the edge or the periphery of the glass so as to shape it according to the required dimensions to adapt the lens to the glass frame wherein it is to be arranged.

Edging is generally done on a grinding machine comprising diamond wheels that perform the machining step as defined hereinabove. The lens is held, upon such an operation, by axially acting blocking members. The relative motion of the lens with respect to the grinding wheel is monitored, generally digitally, so as to provide the desired shape.

As it appears, it is mostly imperative that the lens be firmly maintained upon such a movement.

To this end, before the edging operation, a lens-blocking step is performed, i.e. a holding means or chuck/acorn element is positioned on the convex surface of the lens.

In an embodiment, the holding means is a chuck that is adhering to the lens using a liquid curable adhesive located between the chuck and the surface of the lens as in the OBM™ process of SatisLoh. The chuck/acorn element can also be integrally molded to the lens.

In another embodiment, the holding means is a chuck that is adhering to the lens using a holding pad, such as a self-adhesive chip, for example a two-sided adhesive, arranged between the chuck and the convex surface of the lens.

In the following description, the blocking will be described in reference to this second embodiment.

The so arranged lens is positioned on one of the above-mentioned axial blocking members, the second axial blocking member clamping then the lens on the concave surface thereof by means of an abutment, generally made of an elastomer.

Upon the machining step, a tangential torque stress is generated on the lens, which may result in a rotation of the lens relative to the chuck if the lens holding means is not sufficiently efficient.

The good holding of the lens mainly depends on the good adhesion at the holding pad/convex surface interface of the lens.

The last generation ophthalmic lenses most often comprise an organic or mineral outer layer modifying the surface energy, for example anti-fouling hydrophobic and/or oleophobic coatings. These are most often materials of the fluorosilane type reducing the surface energy so as to avoid the adhesion of fatty deposits, such as fingerprints, sebum, sweat, cosmetics, which are thus easier to remove.

Such a surface coating type may be so efficient that the adhesion at the pad/convex surface interface may be thereby altered, making difficult satisfactory edging operations, in particular for polycarbonate lenses the edging of which generates much larger efforts in comparison with other materials. The consequence of a badly performed edging operation is the pure and simple loss of the lens.

To achieve satisfactory edging performance for an optical lens, it is advantageous to deposit on its outer layer a temporary protective layer, imparting a surface energy at least equal to 15 mJ/m$^2$, in particular a fluoride, oxide or metal hydroxide layer, and preferably, a $MgF_2$ protective layer, as well as a marking ink or a resin being the binder of such marking inks, such as disclosed in applications n° EP 1392613 or WO 03/057641. The protective temporary coating ensures good adhesion at the holding pad/convex surface interface.

Optical lenses, more particularly, ophthalmic lenses, optionally comprising one or more conventional functional coatings, such as a primer coating improving the adhesion of other functional layers, an anti-abrasion coating and an anti-reflection coating, and comprising a hydrophobic and/or oleophobic surface coating, in turn being at least partially coated with a protective temporary coating that may be used for improving the edging operation, are each stored and delivered in paper bags innerly provided with a protective coating. The bags, each containing a lens, may be stacked onto one another during storage or shipping.

It has been found that, due to frictions or even simple pressures, during storage or handling of such lenses, including in their respective bags, the protective temporary coating was being altered, in particular in coatings comprising an outer metal fluoride layer and more especially a $MgF_2$ protective layer, that could lead to a loss of adhesion with the holding pad during the edging operation. Such an alteration can be observed visually, more specially in the case of a $MgF_2$ outer layer, through the occurrence on the temporary protective outer layer of marks which are visible to the naked eye.

U.S. Pat. No. 5,792,537 discloses the protection of erasable marks being printed on the surface of an optical lens during the grinding operation of such a lens by masking the marks using an adhesive tape. The adhesive tape can be an electrostatic film such as a highly plasticized vinyl film.

WO 2005/031441 discloses an optical lens comprising, in this order, a hydrophobic and/or oleophobic coating, a temporary outer protective coating covering at least partially said coating and comprising an outer layer capable of being mechanically degraded through friction and/or contact, typically a $MgF_2$ layer, wherein the temporary outer protective coating is coated with a peelable film electrostatically adhering to the degradable outer layer, e.g., a highly plasticized PVC film. Said peelable film efficiently protects the underlying layer from degradation that may occur during handling, transportation and/or storage of the lenses.

Other polymer removable films for protecting the external surface of lenses during handling, transportation and/or storage thereof are disclosed in U.S. Pat. Nos. 5,883,169, 5,451,281 and JP 06-230319.

However, these removable films are not fully satisfactory, as adhesion at the interface of lens/temporary protective film can become lower than that at the interface of temporary protective film/removable (polymer) film. In certain cases, particularly when the lens outer functional coating is a hydrophobic and/or oleophobic coating (top coat) which is so effective that its surface energy is very low, peeling of the removable polymer film prior to edging also leads to removal of at least part of the temporary protective coating due to its lower adhesion to the top coat.

Thus, the temporary protective coating can be removed to such an extent that it no longer fulfills its function of rendering an optical lens apt to edging. Said temporary protective coating may even be completely removed upon peeling-off of the polymer film.

Therefore, it is necessary to find alternative films for replacing the previously known peelable films used to protect the lens surface from degradation.

SUMMARY OF THE INVENTION

An object of the present invention is to provide an optical lens, more particularly an ophthalmic lens, comprising an outer protective coating capable of being mechanically degraded through friction and/or contact, which is protected from such a degradation, more particularly when the lens is being stored and/or handled.

Another object of the invention is the development of an outer protective film that maintains a reasonably good quality of the temporary protective coating remaining at the surface of the lens after removal of said outer protective film, for example prior to the edging operation. Removal of said film should not alter the quality of the protective temporary coating to an extent that would result in an insufficient adhesion level of the holding pad to the surface of the lens, thus preventing from achieving a satisfactory edging operation for the lens.

According to the invention, the optical lens comprises:

(i) a temporary protective coating at least partially covering a surface of the lens, said temporary protective coating comprising an outermost layer mechanically degradable through friction and/or contact, and (ii) a removable film having a first side and a second side, which adheres to said outermost layer of the temporary protective coating through its first side, the first side of the removable film having at least one surface portion which, when applied to said outermost layer of the temporary protective coating, comprises at least one adherent zone and at least one non-adherent zone distributed across said surface portion.

The releasably sealable film according to the invention effectively addresses the problem of elimination of the temporary protective coating by providing a removable film exhibiting intermittent adherence and/or contact with the surface of the lens. Removal of said film preserves the temporary protective coating to an extent that gives enough adhesion at the interface holding pad/lens surface to achieve a satisfactory edging operation.

In one preferred embodiment, the removable film is not a smooth and flat film but a film having a textured/structured surface.

In another preferred embodiment of the invention, the first surface of the removable film is partially coated with an adhesive material, preferably a pressure-sensitive adhesive (PSA), so as to form at least one adhesive zone, which will adhere to the surface of the temporary protective coating.

Preferably, the surface of the temporary protective coating that is in contact with adherent zones of the removable film represents less than 30% of the surface of said coating.

The invention also relates to a method for edging an optical lens, more particularly an ophthalmic lens, comprising the steps of:

providing an optical lens such as herein described;

removing the removable film, which lays bare the mechanically degradable outermost layer of the temporary protective coating;

depositing the optical lens in an edging device comprising a holding means, preferably a pad, such that the holding means adheres to the mechanically degradable outermost layer of the temporary protective coating;

edging the optical lens;

removing the temporary protective coating; and recovering an edged optical lens.

The invention further relates to the use of a removable film having a first side and a second side, for protecting against degradation the surface of an optical lens as defined hereabove (e.g., during storage and/or handling), wherein the removable film adheres to the outermost layer of the temporary protective coating through its first side, said first side comprising at least one surface portion which, when applied to said outermost layer of the temporary protective coating, comprises at least one adherent zone and at least one non-adherent zone distributed across said surface portion.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawings, wherein FIG. 1 exhibits the texture of the active surface Press & Seal film sold by The Glad Products Company (i.e., the surface that will contact the temporary protective coating), which is a removable film according to one embodiment of the claimed invention, and wherein

DETAILED DESCRIPTION OF THE INVENTION AND PREFERRED EMBODIMENTS

Figure 1:
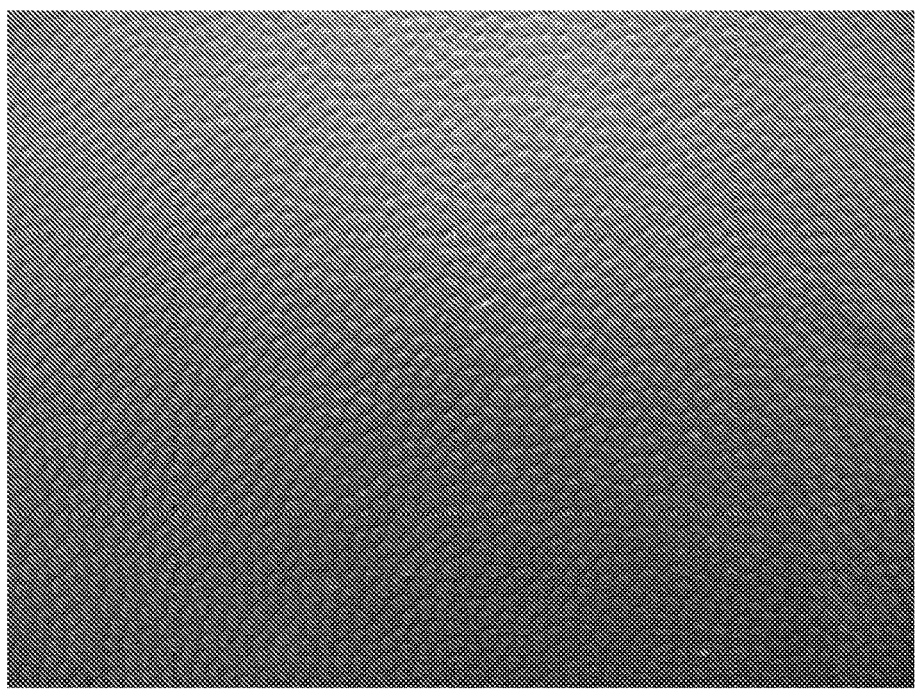

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

When an optical article comprises one or more surface coatings, the phrase "to deposit a coating or layer onto the optical article" means that a coating or layer is deposited onto the outermost coating of the optical article, i.e. the coating which is the closest to the air.

A coating that is "on" a side of a lens is defined as a coating that (a) is positioned over that side, (b) need not be in contact with that side, i.e., one or more intervening coatings may be disposed between that side and the coating in question (however, it is preferably in contact with that side), and (c) need not cover that side completely.

When a "layer 1 is placed under a layer 2", it means that the layer 2 is the farthest from substrate as compared to the layer 1. Similarly, an "external" layer is farther from the substrate than an "internal" layer.

Herein, the term "lens" means an organic or inorganic glass lens or lens blank, preferably an ophthalmic lens or lens blank, comprising a lens substrate which may be coated with one or more coatings of various natures, such as an impact resistant primer coating, an abrasion- and/or scratch-resistant coating or an antireflection coating. Such substrates and coatings are described in greater detail in WO 2010/136484 and WO 2010/109154 that are incorporated herein by reference.

According to the invention, the optical lens may be coated on its convex main side (front side), concave main side (back side), or both sides with the stack of coatings or films previously mentioned.

The optical lenses according to the invention generally comprise a hydrophobic and/or oleophobic surface coating and preferably comprise both a hydrophobic and/or an oleophobic surface coating deposited on a mono- or multilayer antireflection coating.

Indeed, hydrophobic and/or oleophobic coatings are generally applied onto lenses comprising an antireflection coating, in particular lenses made of a mineral materials, so as to reduce their strong tendency to staining, for example towards greasy deposits. Antireflection coatings are described e.g. in WO 2010/109154.

The anti-fouling top coat is defined as a hydrophobic and/or oleophobic surface coating. Hydrophobic and/or oleophobic coatings are obtained through the application, generally on the surface of the anti-reflection coating, of compounds reducing the surface energy of the lens. The ones preferably used in this invention are those which reduce surface energy of the article to less than 20 mJ/m$^2$. The invention has a particular interest when using anti-fouling top coats having a surface energy of less than 14 mJ/m$^2$, preferably less than 13 mJ/m$^2$ and even better less than 12 mJ/m$^2$.

The surface energy values referred to herein are calculated according to Owens Wendt method, described in the following reference: Owens, D. K.; Wendt, R. G. "Estimation of the surface force energy of polymers", J. Appl. Polym. Sci. 1969, 51, 1741-1747.

Hydrophobic and/or oleophobic coatings generally impart to the lens a water contact angle of at least 90°, preferably at least 100°, more preferably at least 110°.

The anti-fouling top coat according to the invention is preferably of organic nature and preferably comprises at least one fluorinated compound. By organic nature, it is meant a layer which is comprised of at least 40% by weight, preferably at least 50% by weight of organic materials, relative to the total weight of the coating layer.

Hydrophobic and/or oleophobic surface coatings most often comprise silane-based compounds bearing fluorinated groups, in particular perfluorocarbon or perfluoropolyether group(s). By way of example, silazane, or silicon compounds are to be mentioned, comprising one or more fluorine-containing groups such as those mentioned here above. Such compounds have been widely disclosed in the previous art, for example in Patents U.S. Pat. No. 4,410,563, EP 0203730, EP 749021, EP 844265 and EP 933377.

A classical method to form an anti-fouling top coat consists in depositing compounds bearing fluorinated groups and Si—R groups, R representing an —OH group or a precursor thereof, such as —Cl, —NH$_2$, —NH— or —O-alkyl, preferably an alkoxy group. Such compounds may perform, at the surface onto which they are deposited, directly or after hydrolysis, polymerization and/or cross-linking reactions with pendent reactive groups.

Preferred fluorinated compounds are silanes and silazanes bearing at least one group selected from fluorinated hydrocarcarbons, perfluorocarbons, fluorinated polyethers such as F$_3$C—(OC$_3$F$_6$)$_{24}$—O—(CF$_2$)$_2$—(CH$_2$)$_2$—O—CH$_2$—Si(OCH$_3$)$_3$ and perfluoropolyethers, in particular perfluoropolyethers.

Among fluorosilanes, there may be cited the compounds having the formulae depicted in WO 2008/141981, which is hereby incorporated by reference. Compositions containing fluorosilanes compounds also useful for making hydrophobic and/or oleophobic top coats are disclosed in U.S. Pat. No. 6,183,872. Other preferred compositions for forming the hydrophobic and/or oleophobic surface coating are those containing compounds comprising fluorinated polyether groups, in particular perfluoropolyether groups. A particular preferred class of compositions containing fluorinated polyether groups is disclosed in U.S. Pat. No. 6,277,485.

The deposition techniques for such anti-fouling top coats are very diverse, including liquid phase deposition such as dip coating, spin coating (centrifugation), spray coating, or vapor phase deposition (vacuum evaporation). Of which, deposition by spin or dip coating is preferred. Preferably, the coating material for forming the anti-fouling top coat is liquid or can be rendered liquid by heating, thus being in a suitable state for deposition. Deposition is followed by curing.

The liquid coating material for forming the anti-fouling top coat of the invention may comprise one or more of the above cited compounds, for example a mixture of fluorinated compounds such as disclosed in WO 2008/053020 or EP 2078977.

Commercial polymerizable compositions for making anti-fouling top coats are the compositions KY130® (as described in JP 2005-187936), KP 801M® commercialized by Shin-Etsu Chemical or OF110™, and the composition OPTOOL DSX® (a fluorine-based resin comprising perfluoropropylene moieties as described in U.S. Pat. No. 6,183,872) and AES4® commercialized by Daikin Industries. OPTOOL DSX® is the most preferred coating material for anti-fouling top coats.

The antifouling coating can be monolayered or multilayered, i.e., can comprise a stack of several layers of antifouling materials such as described hereabove, in particular two layers. Examples of such multilayer hydrophobic and/or oleophobic coating can be found in PCT/EP2013/078016 and PCT/EP2013/077978, incorporated herein by reference.

Typically, a bilayer hydrophobic and/or oleophobic coating is obtained by depositing OPTOOL DSX™/OF110™ or OF 210™; or AES4™/OF110™ or OF210™.

Generally, the deposited anti-fouling top coat has a physical thickness lower than 30 nm, preferably less than 20 nm, more preferably less than 20 nm, even better less than 10 nm, ideally less than 5 nm. The anti-fouling top coat preferably has a thickness from 1 to 10 nm, more preferably 2 to 5 nm, even better 2 to 4 nm. Control of the deposited thickness can be performed by means of a quartz scale.

The temporary protective coating generally increases the surface energy of the lens up to a value at least of 15 mJ/m$^2$. It is generally directly deposited onto a hydrophobic and/or oleophobic coating.

It can be applied on an area covering the whole of at least one of the two sides of the lens or only on the area intended to be in contact with the holding pad of said lens, and preferably at least covers the central part of the lens.

More precisely, it is usual to deposit the holding pad, associated with the acorn, on the lens convex side. It is therefore possible to cover with the protective coating the whole convex side or, alternatively, only a central area of the convex side, using a mask or any other appropriate technique.

The deposit can equally cover the corresponding area, i.e. it has a continuous structure, but it can also have a discontinuous structure for example, having the shape of a frame. In such a case, an irregular deposit is formed, with its surface remaining sufficient so as to provide the required adhesion of the holding pad. The discontinuous structure deposits can be obtained through pad printing.

However, the area covered by the temporary outer protective coating (according to the invention) should be such that the contact surface between the protective coating and holding pad is sufficient to provide the adhesion of the lens to the pad.

Generally, the temporary protective coating covers at least 15%, preferably at least 20%, more preferably at least 30%, much more preferably at least 40%, and most preferably the whole surface of the lens on which the pad is to be adhered.

As a result of depositing the temporary outer protective coating, a lens is obtained, being able to be edged. This means that after the edging operation according to the method of the invention, the glass will have the required dimensions allowing to be suitably inserted into the glass frame wherein it is to be arranged.

More precisely, such a result is obtained when the lens, during the edging operation, is subjected to an offset of maximum 2°. An optimal edging ability corresponds to a lens having an offset equal to or lower than 1°.

The temporary protective coating can be made of any material adapted to increase the surface energy of the lens with hydrophobic and/or oleophobic properties and being able to be removed during a subsequent operation following the edging step.

Of course, the material should be such as to avoid from definitely degrading the surface properties of the hydrophobic and/or oleophobic coating and such that, after its removal, the optical and surface properties of the lens are globally identical to those the lens had before the temporary protective coating was deposited.

Preferably, the temporary outer protective coating comprises a mineral outer layer, and more particularly, a metal fluoride or a blend of metal fluorides, a metal oxide or a blend of metal oxides or a metal hydroxide or a blend of metal hydroxides as well as a blend of such fluorides, oxides and hydroxides. More preferably, the outer layer of the temporary protective coating consists of a metal fluoride, a metal oxide or a metal hydroxide, or mixtures thereof.

Examples of fluorides include magnesium fluoride $MgF_2$, lanthanum fluoride $LaF_3$, aluminium fluoride $AlF_3$ and cerium fluoride $CeF_3$. Useful oxides are magnesium oxide (MgO), calcium oxide (CaO), titania ($TiO_2$), alumina ($Al_2O_3$), zirconia ($ZrO_2$), or praseodymium oxide ($Pr_2O_3$). Mixtures of alumina and praseodymium oxide are suitable. A particularly suitable material is PASO2 from Leybold Corporation.

Silicon oxide, especially silica can also be used. Examples of metal hydroxides comprise $Mg(OH)_2$, $Ca(OH)_2$ and $Al(OH)_3$, preferably $Mg(OH)_2$. The particularly preferred material is $MgF_2$.

The temporary protective layer can be deposited using any suitable conventional method, preferably vacuum deposition.

When it is made of a mineral material, the thickness of the temporary protective coating is preferably lower than or equal to 50 nm, and generally ranges from 1 to 50 nm, and more preferably from 5 to 50 nm.

Generally, if the protective coating thickness is too low, there is the risk that the surface energy will be insufficiently modified.

If, on the contrary, the protective coating thickness is too high, more particularly for essentially mineral coatings, the inventors have found out that there is the risk that mechanical stresses could occur within the coating, which is detrimental to the expected properties.

When it is made of an organic material, the thickness of the temporary protective coating preferably ranges from 5 to 150 μm.

As an alternative to the above-mentioned mineral materials, one can use an organic ink which may be used for marking progressive ophthalmic glasses and/or a resin chosen from resins which may form the binding agent of an ink capable of being used for marking progressive ophthalmic glasses. Resins of the alkyd type are particularly suitable.

The temporary outer protective coating can be monolayered or multilayered, in particular bi-layered.

The layers can all be mineral or some of them can be organic and the others mineral. In the case of a bilayer temporary protective coating, an organic layer is preferably deposited onto a mineral layer. Said mineral layer is preferably 5 to 200 nm thick and said organic layer is preferably 0.2 to 10 μm thick.

In another embodiment of the invention, the temporary protective layer comprises a stack of two mineral layers, preferably a first layer of $MgF_2$ onto which is deposited a second layer of MgO. It is also possible to obtain a graded temporary protective layer, for example by evaporating part of a first material, then starting evaporation of a second material, and then stopping evaporation of the first material, so that there is obtained a gradient, the composition of which varies from pure first material to pure second material away from the substrate.

The temporary outer protective coating is mechanically alterable through friction and/or contact. Mechanically alterable through friction and/or contact according to the invention means a coating being partly or totally removed after having been subjected to a dry wiping, consisting in 5 to and fro movements on the wiping area with a Wypall L40® cloth from the KIMBERLY-CLARK corporation, while maintaining a 3 kg/cm$^2$ pressure.

The invention is particularly useful for covering brittle temporary outer protective coatings, i.e. which are removed partly or totally after being subjected to a dry wiping consisting in 5 to and fro movements on the wiping area with the above-mentioned Wypall cloth, while maintaining a 60 g/cm² pressure.

According to the invention, the temporary protective coating is coated with a removable film having a first side adhering to the coating surface, i.e., to the outermost layer of the temporary protective coating. Said first active side of the removable film has a partially adherent surface when applied to said outermost layer of the temporary protective coating, i.e., has at least one surface portion comprising at least one adherent zone and at least one non-adherent zone, distributed across said surface portion.

As used herein, an adherent zone of the surface of the removable film is a surface area of said film that will adhere to the outer surface of the temporary protective coating when the removable film is applied against it and that will cause the temporary protective coating to be at least partially stripped off upon removal of the removable film. Said adherent zone corresponds to an adhesive zone of the film and the adherent character depends on the coating stack present at the surface of the lens.

As used herein, a non-adherent zone of the surface of the removable film is a surface area of said film that will not adhere to the outer surface of the temporary protective coating when the removable film is applied against it. Said non-adherent zone corresponds to a non-adhesive zone of the film or to a (potentially adhesive) zone of the film which is not in contact with the outermost layer of the temporary protective coating. A non-adherent zone will not cause the temporary protective coating to be stripped off upon removal of the removable film. The non-adherent character of a surface of the film depends on the coating stack present at the surface of the lens.

As used herein, an adhesive zone of the surface of the removable film is a surface area of said film that has the ability to theoretically adhere to the material of the temporary protective coating. An adhesive zone is not necessarily coated with a layer of adhesive, as adhesion can result from electrostatic forces. This ability to (potentially) adhere only depends on the surface physico-chemical properties; surface texture is not taken into account. This means that adhesive zones can be adherent zones when pressed against the target surface, or can be non-adherent if they are not in contact with the target surface despite the pressure applied, because of a particular surface relief.

Inversely, a non-adhesive zone of the surface of the removable film is a surface area of said film that has no ability to adhere to the outer surface of the temporary protective coating, i.e., a flat non-adhesive zone of the surface of the removable film would not adhere to a flat temporary protective coating. For example, ink dots may be applied on an electrostatic film. There will be no electrostatic interaction and consequently no adhesion with the temporary protective coating in the zone covered by the dots. Such films are available at Sericom Plastorex (Argenteuil France) under the name L20/R100/Cool Gray 2 to 8.

The first side of the removable film has a patterned surface that can have regular or irregular patterns. In a preferred embodiment, the first side of the removable film has at least one surface portion comprising a plurality of adherent zones and non-adherent zones (when applied to said outermost layer of the temporary protective coating) that are essentially uniformly distributed across said surface portion.

The removable film material can be composed of any material that may be removed in a later operation. It is preferably of polymeric nature, and is generally a flexible film made in a plastic material. It may be composed of one or more polymer(s) preferably selected from polyethylene or polyvinyl chloride (PVC), having preferably a high plasticizer content, i.e. at least 20% by weight, preferably at least 30% by weight and typically ranging from 30 to 60% by weight. The material may also comprise reinforcement elements and come for example as a carbon- or glass-fiber reinforced resin.

The removable film has to be sufficiently flexible to conform readily to the surface of the lens and have sufficiently small resiliency that it does not exert undue restorative forces which would tend to cause it to break contact with the exposed surface of the lens.

In a first preferred alternative of the invention, the first surface of the removable film has at least one surface portion that is partially coated with an adhesive material so as to form at least one adherent/adhesive zone, preferably pressure-sensitive adhesive (PSA), which will adhere to the surface of the temporary protective coating, and comprises at least one non-adhesive zone. Its second side facing outward is typically not coated, and generally non-adhesive. However, the adhesive film of the invention can also be made adhesive on both faces by depositing an adhesive layer onto its second main surface.

Said surface portion of the first surface of the removable film that is partially coated with an adhesive material preferably at least covers the central part of the lens.

The adhesive applied to the first side of this composite film forms a continuous or discontinuous layer having preferably a thickness of less than 50 µm, preferably less than 25 µm.

The adhesive adheres preferentially to the first surface of the removable film, so that it is peelable from the target surface, i.e. stays with the film upon removal of the film.

As used herein, a "pressure-sensitive adhesive" or a "contact adhesive" is intended to mean an adhesive which is able to adhere to a surface by simply exerting a pressure with no need to use any additional external source of energy such as temperature, irradiation or solvent. However, other external sources of energy may be used for improving adhesion. This adhesive is permanently tacky in a dry form (with no solvent), at room temperature or at its working temperature.

Its glass transition temperature Tg may preferably vary from −45° C. to 0° C. PSA and methods for applying them onto surfaces, preferably under a latex form, are known per se and are described in greater detail in WO 2010/055261, which is incorporated herein by reference.

PSA used in the present invention are preferably selected from polyacrylate-based, polyurethane-based and/or styrene block copolymer-based PSAs, such as styrene-isoprene block copolymers.

Since the active surface of the removable film is partially coated with adhesive in this embodiment, and comprises non-adhesive zones, its removal does not cause peeling off of the whole temporary protective coating, but rather no stripping of the temporary protective coating or limited stripping. The great majority of the temporary protective layer remains unaffected by the removal of the film.

The adhesive must be applied at the surface of the film in such a manner that removal of the film, which generally also partially removes the temporary protective coating, will not result in a temporary protective coating that no longer fulfils its function of allowing to safely perform the edging operation.

Therefore, the surface area of the adhesive film coated with adhesive, or more precisely the surface area of the temporary protective coating in contact with adhesive, must be sufficiently low so as to avoid a too important stripping of the temporary coating. Preferably, the surface of the temporary protective coating that is in contact with the adhesive (which generally corresponds to the surface of the adherent zones) of the removable film represents less than 30 of the surface of said coating, preferably less than 20%, better less than 10%.

However, the percentage of film surface covered by adhesive is not the sole parameter to take into account. Distribution of the adherent zones across the surface of the film is also crucial. Obtaining an adequate distribution of said zones across the film surface is naturally within the skills of a person of ordinary skill in the art.

In one embodiment, the first side of the removable film has a surface portion that is in contact with the central part of the surface of the lens, and said surface portion is not coated with adhesive/non-adherent. The central part of the surface of the lens is intended to be in contact with the holding pad during edging (and is therefore generally coated with the temporary protective coating) and should exhibit a high adhesion level to said holding pad.

For example, one can use a stickable and removable film that is only coated with adhesive in the peripheral area of its first side and has a central non-adherent surface. Said peripheral area, which preferably has the shape of a crown, can be uniformly coated with adhesive (thus defining one adhesive zone and one non-adhesive zone at the surface of the film) or comprise a plurality of adhesive zones and non adhesive zones.

The adhesive can be applied to the surface of the removable film according to well known methods, for example by depositing onto the required surface portion(s) a liquid adhesive composition followed with a curing or drying step. The adhesive can also be applied through bonding one or more pre-formed adhesive films (having one or two adhesive faces) to the required surface portion(s) of the first side of the removable film.

The active side of the removable film is optionally provided with a protective liner before application of said film to the surface of the lens.

According to the preferred embodiment of the invention, the first side of the removable film (i.e., its active side) has at least one surface portion comprising a plurality of three-dimensional non-adhesive protrusions/peaks extending outwardly from said surface portion, and separated by valleys, and pressure sensitive adhesive adhering to and partially filling said valleys.

The first side of this removable film exhibits an adhesion peel force after activation by a user which is sufficient to form a preferably continuous releasable seal against the outer surface of the temporary protective coating. Thus, the removable film has substantially no adhesion properties prior to applying pressure thereto.

Briefly, the three-dimensional non-adhesive protrusions serve as standoffs such that the adhesive surrounding the protrusions is spaced away and does not come into contact with an object until the removable film and object are pressed together. The adhesive has a thickness less than the height of the non-adherent protrusions before activation by applying pressure. When pressure is applied to the removable film so as to urge it against the temporary protective coating, the protrusions are deformed (collapse), which enables the adhesive located between and partially filling the valleys to come into contact with the target surface. A seal is thus made between the adhesive of the removable film and the target surface.

The adhesive preferably forms an interconnected layer such that attachment of said adhesive to the target surface forms a continuous seal, which means that the valleys are interconnected.

Protrusions preferably have a base diameter of 150 µm to 2 mm, more preferably 200 to 800 µm, better 300 to 800 µm, a height of 50 to 300 µm, preferably 100-300 µm, better 100-200 µm (measured from the top of the raised features), and valleys separating the protrusions preferably have a length of 100 to 1000 µm, preferably 200 to 500 µm. Protrusions are preferably conical in shape, with truncated or domed outermost ends in a preferred embodiment. They also have a center-to-center spacing preferably of from 400 to 1500 µm, preferably of from 700 to 1400 µm and their outermost ends preferably extend 75 to 250 µm beyond the surface of layer of adhesive. Each protrusion preferably has a height less than its base diameter, so that when pressed, the plurality of protrusions will collapse along an axis which is substantially perpendicular to the adhesive surface of the film. This mode of collapse avoids protrusions preventing contact between the adhesive and the target surface.

This removable film is linerless, such that activation of the active side requires no removal of components therefrom.

The following patents disclose how to make and use such removable films and are hereby incorporated by reference in their entireties: U.S. Pat. Nos. 5,662,758; 5,871,607; 5,965,235; 6,193,918; 6,194,062; 6,421,052; and 6,489,022. The following related patents are also hereby incorporated by reference in their entireties: U.S. Pat. Nos. 5,968,633; 6,099,940; 6,254,965; 6,602,454; 6,602,580; 6,773,647; 6,818,292; and 6,858,285.

Non-limiting examples of removable films according to this preferred embodiment of the invention are the plastic sealing wrap products sold under the trademark PRESS'N SEAL (The Glad Products Company) and under the trademark GRIPTEX (The Procter & Gamble Company).

In a second preferred alternative of the invention, the first surface of the removable film has at least one surface portion comprising at least one adherent/adhesive zone and at least one zone in which the removable film and the outermost layer of the temporary protective coating are not in contact. The non-adherent zones in which the removable film and the outermost layer of the temporary protective coating are not in contact may indifferently be adhesive or non-adhesive. Said surface portion preferably at least covers the central part of the lens.

The second side of this removable film can be such as described above in the first preferred alternative.

In one embodiment, said adherent zone is coated with an adhesive material. In another embodiment, said adherent zone is not coated with an adhesive material, but is adhesive by itself, for example adheres to the surface of the lens by electrostatic adhesion. In a third embodiment, the first surface of the removable film has at least one surface portion comprising at least one adherent zone coated with adhesive, at least one adherent zone not coated with adhesive, and at least one zone in which the removable film and the outermost layer of the temporary protective coating are not in contact.

Since the active surface of the removable film is partially not in contact with the removable film, its removal does not cause peeling off of the whole temporary protective coating, but rather no stripping of the temporary protective coating or limited stripping. As previously, preferably the great majority of the temporary protective layer remains unaffected by the removal of the film.

In the case the removable film is partially coated with adhesive (for example, a film having a first side with at least one surface portion comprising a plurality of three-dimensional protrusions/peaks coated with adhesive extending outwardly from said surface portion, and separated by valleys), what has been disclosed in the first preferred alternative concerning nature of the adhesive, spatial distribution etc. also applies to this second preferred alternative.

The embodiment in which the adherent zones are not coated with an (additional) adhesive material, but adhere to the surface of the lens by electrostatic adhesion will now be described in detail.

Removable/peelable electrostatic films according to the invention can be obtained by subjecting to an embossing process a film that is capable of electrostatically adhering to a target surface. This process delivers a film having a textured surface on its first side, with peaks and valleys, said surface being uniformly adhesive, but partially adherent when pressed against the target surface.

Electrostatic peelable films are known per se and are flexible films made in a plastic material, preferably in polyvinyl chloride (PVC), with high plasticizer content, i.e. at least 20% by weight, preferably at least 30% by weight and typically ranging from 30 to 60% by weight. A non limiting example of such a film is a PVC peelable electrostatic film (150 µm thick) containing 36% by weight of plasticizer marketed by JAC corporation under the reference STICK 87015. Such electrostatic films generally have the form of A4 sheets, wherefrom the desired portion can be cut out so as to provide the coating protection.

It is also known that mechanical embossing can be used to physically imprint a relief or 3D microstructure onto the surface of an electrostatic film by applying pressure to the backside of the film.

Thus, sheets of thermoplastic material can be embossed by passing the corresponding sheet between a pair of cylindrical rollers, that is, an embossing roller and a backing (counter) roller, an embossing stamper with a textured pattern (which is the reverse of the pattern to be formed), also known as an embossing shim, being attached to the outer surface of the embossing roller. The film is pushed or pulled between the two rollers. The raised or textured embossing shim located on the embossing roller forces the film against the backing roller, whereby the protrusion pattern of the embossing roller is engraved in the film optionally under pressure at the shaping temperature thereof (above the glass transition temperature of the film). Embossing of films is described in greater detail in U.S. Pat. Nos. 4,259,285 or 4,486,363. Alternatively, textured electrostatic films can be produced by molding, or by any one of the methods disclosed in U.S. Pat. No. 6,489,022, such as thermoforming.

Preferably, the first side (active side) of the removable film has at least one surface portion comprising a plurality of three-dimensional adhesive protrusions/peaks extending outwardly from said surface portion, and separated by valleys.

In this embodiment, the removable film must be manufactured in such a manner that removal of the film, which generally also partially removes the temporary protective coating, will not result in a temporary protective coating that no longer fulfils its function of allowing to safely perform the edging operation.

Therefore, the surface of the temporary protective coating in contact with the electrostatic film must be sufficiently low so as to avoid a too important stripping of the temporary coating. In this alternative of the invention, the surface of the temporary protective coating that is in contact with the removable film preferably represents less than 30% of the surface of said coating, preferably less than 20%, better less than 10%. Such result can for example be obtained by adapting the number of protrusions imprinted in the film surface.

However, the percentage of the temporary coating surface in contact with the electrostatic film is not the sole parameter to take into account. Distribution of the adherent zones across the surface of the film is also crucial. Obtaining an adequate distribution of said zones across the film surface is naturally within the skills of a person of ordinary skill in the art.

The thickness of the removable film according to the invention is preferably lower than or equal to 200 µm, more preferably lower than or equal to 150 µm, even better lower than or equal to 100 µm and generally ranges from 10 µm to 200 µm, more preferably from 20 µm to 150 µm. When the film has a textured surface, this thickness is measured from the top of the protrusions.

The removable film of the invention can be applied to the surface of the lens very simply, by manually pressing its adhesive side against the temporary protective coating.

The removable film is applied to the surface of the lens so as to cover at least partially the temporary protective coating, or the whole surface thereof. The removable film is preferably applied so as to at least cover the central area of the lens. Generally, the removable film covers at least 15%, preferably at least 20%, more preferably at least 30%, much more preferably at least 40%, and most preferably the whole surface of the lens.

The removable film may uniformly cover the target surface, that is to say have a continuous structure, but it may also have a discontinuous structure, for example being in the form of a screen. The film may indeed be for example "punctured" so as to create at least one hole and avoid removing erasable marks that would be present on the surface of the lens and not covered by the temporary protective coating, especially on progressive multifocal lenses. The shape of the removable adhesive film is not limited and it can be, without limitation, of circular, elliptical, rectangular or oblong form.

The removable film generally comprises a main part with a circular general shape and a gripping tab extending from the circumference of the centre part beyond the lens edge. Such a tab allows the peelable film to be easily removed when necessary.

As a result of depositing the removable film, a lens is obtained, having its outer surface suitably protected from degradation.

The lens according to the invention can be subjected to a quite conventional edging operation, except that, before the edging operation, the removable film should be removed, and, in a final step, a removal operation of the temporary protecting coating is to be carried out.

After removal of the removable film, the surface of the lens still covered with the temporary protective coating must be such that the contact area between said coating and the holding pad is sufficient for ensuring the adhesion of the lens to the pad. Generally, the temporary protective coating remaining at the surface of the lens must still represent at least 50%, preferably at least 60%, more preferably at least 70%, even more preferably at least 75% of its initial surface after removal of the removable film. What has to be taken into account is to still cover the central part of the lens.

Peeling off the removable film according to the invention preferably removes a low surface % of the temporary protective coating. Indeed, the lens surface area which faced the non-adherent zones of the film (e.g., the non-adhesive protrusions or the zones of non-contact), and which was thus not removed, generally represented the majority of the surface of the film. When peeled off, the removable film usually removes partially or totally only the protective temporary coating which was in contact with the adherent zones of the film.

Using a removable film in accordance with the present invention makes it possible to successfully perform the edging of the lens, with no offset thereof or just a minimal one, after removal of this film.

The lens edging process comprises blocking the lens provided with the temporary protective coating contacting e.g., a hydrophobic and/or oleophobic coating, that is to say a step for arranging said lens in an edging device comprising a holding system fitted with a holding means adhering to the external surface of the temporary protective coating, edging the blocked lens, and a deblocking step consisting in removing the holding element from the lens surface. These additional steps are traditional and known to the person skilled in the art (see for example EP 1392613 and US 2005/042977), and therefore they will not be described in detail. Holding systems are described in greater detail in WO 2010/055261.

The removal step of the temporary protective layer can be carried out either in a liquid medium, or through dry wiping, or also through the sequential implementation of those two means, such as disclosed in WO 2005/031441.

At the end of the removal step of the temporary protective layer, the lens exhibits optical and surface features of the same order, even nearly identical to those of the initial lens, more particularly comprising the hydrophobic and/or oleophobic coating.

Now, the present invention will be described in more detail with reference to the following examples. These examples are provided only for illustrating the present invention and should not be construed as limiting the scope and spirit of the present invention.

EXAMPLES

The deposits are carried out on substrates which are CR39® based, ORMA® 15 Supra, ophthalmic lenses, with a −2.00 dioptre power, 65 mm diameter, comprising, on both sides, an anti-abrasion coating of the polysiloxane type described in example 3 of EP 0614957.

1-1 Description of the Substrate Processing

The vacuum treating machine being used was a Balzers BAK760 machine provided with an electron gun, an ion gun of the "End-Hall" Mark 2 Commonwealth type and a Joule effect evaporation source.

The lenses were arranged on a carrousel, with the concave side facing the evaporation sources and the ion gun. A pumping operation was performed until a secondary vacuum was reached.

The substrate surface was activated irradiating it with an argon ion beam, using the Mark 2 ion gun.

Then, after the ion irradiation has been interrupted, a successive evaporation was performed, with the electron gun, of 4 anti-reflection optical layers, high refractive index (HI), low refractive index (BI), (HI), (BI): $ZrO_2/SiO_2/ZrO_2/SiO_2$ having the following respective physical thicknesses: 27, 21, 80 and 81 nm.

A hydrophobic and oleophobic coating layer based on the product AES4® was deposited. More specifically, through successive evaporation of AES4® sold by Daikin Industries, and then OF110™ sold by Optron. The thickness of the resulting hydrophobic and oleophobic coating was around 5 nm.

Finally, a bilayer temporary protective coating was deposited through vacuum evaporation using the electron gun. First, a 20 nm thick $MgF_2$ layer was deposited from particles having a 1 to 2.5 nm grain size, sold by Merck Corporation (0.8 nm/s), and then a 2 nm thick MgO layer was directly deposited onto the $MgF_2$ layer from MgO granules (reference 700428, sold by UMICORE), Subsequently, the enclosure was heated again and set back to the atmosphere of the treatment chamber.

The lenses were then turned upside down and their convex side oriented towards the treatment area. The convex side was treated identically to the concave side (reproducing the above described steps).

1-2 Application of the Removable Films 15 lenses were manually coated in the middle of the convex side of the lenses with a peelable electrostatic film having the shape of a daisy (Sericom—Plastorex Corporation, JAC manufacturer). This PVC film (38 mm diameter, 150 μm thickness, equipped with a tab) is represented on the figure of WO 2005/031441. The so-obtained lenses are comparative lenses.

Similarly, 15 lenses were manually coated in the middle of the convex side of the lenses with a Press & Seal film sold by The Glad Products Company, having the same daisy shape. This daisy shape was obtained by die cutting the commercial plastic wrap. This film (38 mm diameter, is a polyethylene film provided with styrene/isoprene copolymer as an adhesive. The surface texture of the Press & Seal film is shown on FIG. 1. Protrusions have a diameter of 300 μm, a height of 100 μm (measured from the top of the raised features), and valleys separating the protrusions have a length of 400 μm.

1-3 Storage of the Lenses, Film Removal and Lens Inspection Step

All of the lenses were then placed in Landouzy/Papier Fabrik Lahnstein paper bags and arranged vertically in a cardboard box. Then the box was stored in an environmental chamber for 14 days at 40° C. and 80% humidity. The substrate/bag pressure is approximately 200 grams.

After 14 days, all of the lenses were removed from the bags. The comparative electrostatic films and the structured films according to the invention were peeled manually by tearing the tab.

The lenses were inspected under a Waldmann lamp. The integrity of the temporary protective layer was visually inspected by reflection. When the temporary protective layer was intact, its reflection was blue colored and even on the whole surface. When the protective layer was altered, its reflection was not even and green colored.

The temporary protective coating was completely removed after peeling off the electrostatic PVC daisy sticker film on comparative lenses. Visually, the reflection from the lens surface which contacted the removable film was green. That means the blue bilayer temporary protective coating has been removed.

The temporary protective coating was partially removed after peeling off the Press & Seal removable film from lenses according to the invention. Less than 10% of the surface of the temporary protective coating was removed by staying stuck to the removed Press & Seal film.

Figure 2:
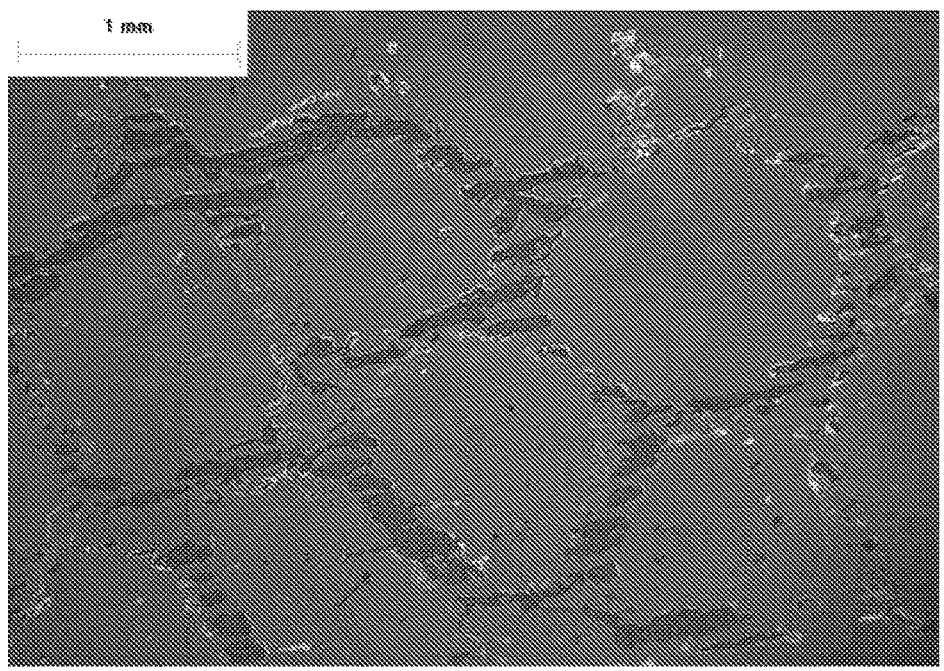
FIG. 2 is a close up view of the surface of a $MgF_2$/MgO temporary protective coating having been subjected to application and peeling off of the above removable film.

FIG. 2 shows what the temporary protective coating looks like after peeling off the Press & Seal removable film. The dark zones represent the portions of the coating that were peeled away.

1-4 Edging of the Lenses

After elimination of their removable film, lenses according to the invention and comparative lenses were subjected to an edging operation. Lenses onto which Press & Seal films were applied showed good adhesion of the holding pad and thus perfect edging ability, while the other lenses with the comparative electrostatic PVC films showed a bad adhesion of the holding pad. The edging operation did not occur properly with the latter lenses.

Example with a mechanically embossed electrostatic film.

An electrostatic film of PVC from Delamare Sovra shaped like a daisy was used.

Embossing Step:

The film was placed between a rubber cushion and a metallic grid having holes (size: 0.83 nm from the edge). A Plastic block was placed on the other side of the grid. The whole system was then placed into a hand press. A force of around 500 lbs was applied on both sides for a few minute. The force was released and the film was structured.

The structured film was then placed on a lens that was previously coated with the hydrophobic topcoat Optool DSX (around 10 nm) and OF210 (3-4 nm) and the over-layer (temporary protective layer) $MgF_2$ (20 nm thick)+MgO (2 nm).

After 1 week, the film was removed and the lenses. 4-8.00+2.00 PC lenses were edged on a Triumph edger. The lens showed good adhesion of the holding pad and thus very good edging ability

The invention claimed is:

1. An optical lens comprising:
   (i) a temporary protective coating at least partially covering a surface of the lens, the temporary protective coating comprising an outermost layer mechanically degradable through friction, contact, or both; and
   (ii) a removable film having a first side and a second side, which adheres to the outermost layer of the temporary protective coating through its first side,
   wherein the first side of the removable film includes at least one surface portion, which, when applied to the outermost layer of the temporary protective coating, comprises a plurality of adherent zones and a plurality of non-adherent zones distributed across the surface portion.

2. The optical lens of claim 1, wherein the removable film has a textured surface.

3. The optical lens of claim 1, wherein the removable film at least covers a central part of the surface of the lens.

4. The optical lens of claim 1, wherein the plurality of adherent zones and non-adherent zones are essentially uniformly distributed across the surface portion.

5. The optical lens of claim 1, wherein the surface of the temporary protective coating that is in contact with adherent zones of the removable film represents less than 30% of the surface of the coating.

6. The optical lens of claim 1, wherein the at least one surface portion of the first side of the removable film comprises at least one adherent zone coated with an adhesive material, and at least one non-adherent zone.

7. The optical lens of claim 6, wherein the adhesive material is a pressure-sensitive adhesive.

8. The optical lens of claim 6, wherein the first side of the removable film has at least one surface portion comprising:
   a plurality of three-dimensional non-adhesive protrusions extending outwardly from the surface portion, and separated by valleys, and
   pressure sensitive adhesive adhering to and partially filling the valleys.

9. The optical lens of claim 1, wherein the at least one surface portion of the first side of the removable film comprises at least one adherent zone and at least one zone in which the removable film and the outermost layer of the temporary protective coating are not in contact.

10. The optical lens of claim 9, wherein the at least one adherent zone adheres to the outermost layer of the temporary protective coating by electrostatic adhesion.

11. The optical lens of claim 1, wherein the outermost layer of the temporary protective coating is made of a at least one material chosen from metal fluorides, metal oxides, metal hydroxides, marking inks for optical lenses, and resins chosen from resins which may form a binding agent of such marking inks.

12. The optical lens of claim 11, wherein the metal fluorides are chosen from $MgF_2$, $LaF_3$, $AlF_3$ and $CeF_3$, the metal oxides are chosen from MgO, CaO, $TiO_2$, $Al_2O_3$, $ZrO_2$ and $Pr_2O_3$, and the metal hydroxides are chosen from $Mg(OH)_2$, $Ca(OH)_2$ and $Al(OH)_3$.

13. The optical lens of claim 11, wherein the metal hydroxide is $Mg(OH)_2$.

14. The optical lens of claim 11, wherein the metal fluoride is $MgF_2$.

15. The optical lens of claim 11, wherein the metal oxide is MgO.

16. The optical lens of claim 1, wherein the temporary protective coating is formed onto a hydrophobic coating, an oleophobic coating, or a hydrophobic and oleophobic coating.

17. The optical lens of claim 16, wherein the hydrophobic coating, oleophobic coating, or hydrophobic and oleophobic coating has a surface energy equal to or lower than 14 $mJ/m^2$.

18. The optical lens of claim 16, wherein the hydrophobic coating, oleophobic coating, or hydrophobic and oleophobic coating has a surface energy equal to or lower than 12 $mJ/m^2$.

19. A method for edging an optical lens, comprising:
   providing an optical lens of claim 1;
   removing the removable film;
   depositing the optical lens in an edging device comprising a holding means, such that the holding means adheres to the mechanically degradable outermost layer of the temporary protective coating;
   edging the optical lens;
   removing the temporary protective coating; and
   recovering an edged optical lens.

20. A process for protecting against degradation of a surface of an optical lens including a surface at least partially covered with a temporary protective coating including an outermost layer mechanically degradable through friction, contact, or both, comprising:
   providing a removable film having a first side and a second side;
   applying the film such that the film adheres to the outermost layer of the temporary protective coating through its first side, the first side including at least one surface portion which, when applied to the outermost layer of the temporary protective coating, includes a plurality of adherent zones and a plurality of non-adherent zones distributed across the surface portion.

21. The optical lens of claim 1, wherein the removable film further comprises a gripping tab.

* * * * *